United States Patent
Bauer et al.

(10) Patent No.: US 7,436,157 B2
(45) Date of Patent: Oct. 14, 2008

(54) DEVICE FOR PREPARING A SUPPLY VOLTAGE

(75) Inventors: Bernhard Bauer, Pentling (DE);
Mauricio Hernandez-Distancia,
Neutraubling (DE); Milan Krstev,
Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 201 days.

(21) Appl. No.: 11/430,497

(22) Filed: May 9, 2006

(65) Prior Publication Data

US 2006/0261787 A1 Nov. 23, 2006

(30) Foreign Application Priority Data

May 17, 2005 (DE) .................. 10 2005 022 533

(51) Int. Cl.
*G05F 3/16* (2006.01)
(52) U.S. Cl. .................. 323/224; 323/272; 363/16
(58) Field of Classification Search ......... 363/16–20, 363/24, 21.14, 21.6, 21.16, 21.8, 21.18; 323/222, 323/264, 273, 272, 224
See application file for complete search history.

(56) References Cited

U.S. PATENT DOCUMENTS 4,017,785 A * 4/1977 Perper .................. 363/37
6,198,262 B1 3/2001 Squibb et al.

FOREIGN PATENT DOCUMENTS

DE 37 16 880 A1 12/1988
DE 101 49 282 A1 4/2003

OTHER PUBLICATIONS

National Semiconductor LM140/LM340A/LM340/LM7800C Series 3-Terminal Positive Regulators; May 1999; Santa Clara, California, USA (www.national.com).

* cited by examiner

*Primary Examiner*—Rajnikant Patel
(74) *Attorney, Agent, or Firm*—Laurence A. Greenberg; Werner H. Stemer; Ralph E. Locher

(57) ABSTRACT

A device for preparing a supply voltage contains an input for receiving the supply voltage and a voltage converter for transforming an input voltage present at an input of the voltage converter into an output voltage to be output at an output of the voltage converter. A voltage limiter is provided for limiting a backwards voltage dropping from the output to the input of the voltage converter. This enables a high level of safety of the voltage converter and a high reliability of the device to be guaranteed, especially against a short circuit condition at the output of the voltage converter.

9 Claims, 2 Drawing Sheets

DEVICE FOR PREPARING A SUPPLY VOLTAGE

CROSS-REFERENCE TO RELATED APPLICATION

This application claims the priority, under 35 U.S.C. §119, of German application DE 10 2005 022 533.0, filed May 17, 2005; the prior application is herewith incorporated by reference in its entirety.

BACKGROUND OF THE INVENTION

Field of the Invention

The present invention relates to a device for preparing a supply voltage. The device features an input for receiving the supply voltage and a voltage converter for transforming an input voltage present at an input of the voltage converter into an output voltage to be output at an output of the voltage converter.

Such a device is known from a motor vehicle in which an engine controller is usually present with which an engine, predominantly meaning electrical and electronic components used in the engine, and sensors used in the motor vehicle are supplied with the power necessary to operate them. The engine controller is supplied with a supply voltage that is made available by a battery. The engine controller contains a voltage converter to transform the supply voltage into the voltage for the components to be supplied by the engine controller.

SUMMARY OF INVENTION

It is accordingly an object of the invention to provide a device for preparing a supply voltage which overcomes the above-mentioned disadvantages of the prior art devices of this general type, which has a high level of safety for a voltage converter.

With the foregoing and other objects in view there is provided, in accordance with the invention, a device for preparing a supply voltage. The device contains an input for receiving the supply voltage and a voltage converter having a converter output and a converter input coupled to the input. The voltage converter transforms an input voltage present at the converter input into an output voltage available at the converter output. A voltage limiter is coupled between the converter output and the converter input for limiting a backwards voltage dropping from the converter output to the converter input. A resistor is connected between the converter input and a ground connection. The resistor limits a current flowing from the converter output, through the voltage limiter to the converter input, and further to the ground connection.

In accordance with the invention the device for preparing the supply voltage is provided with the voltage limiter for limiting a backwards voltage occurring at the voltage converter. Here the backwards voltage is a voltage at the voltage converter dropping from its output to its input.

Conventional available voltage converters have a breakdown voltage of a few volts. If a voltage larger than the breakdown voltage is present from the output of the voltage converter to its input, the voltage converter is normally destroyed. The voltage limiter advantageously protects the voltage converter from destruction since it limits the maximum backwards voltage able to drop at the voltage converter. This is above all advantageous in the event of a short circuit between the battery and the output of the voltage converter or at the output of the device. With a supply voltage which is higher than 12 V, i.e. primarily 24 V, 42 V or similar, the voltage converter will thus not be destroyed if there is a short circuit to the battery.

The input of the voltage converter is additionally connected to ground via a resistor. In this way a current flowing as the result of the backward voltage can flow away to ground via the first diode and the resistor. The resistor advantageously limits the current.

In accordance with a preferred further development of the invention the voltage limiter is connected in parallel to the voltage converter. This allows an immediate, direct protection of the voltage converter (converter) to be guaranteed in a simple manner.

Advantageously the voltage limiter features a first diode of which the anode is connected to the output of the voltage converter and of which the cathode is connected to the input of the voltage converter. The diode is a low-cost and simple component with which the protection function can be securely fulfilled.

In accordance with a further preferred development of the invention a step-down converter is connected between its input and the output of the voltage converter for converting the supply voltage into a lower voltage. The step-down converter initially transforms a high supply voltage of for example 24 V or 42 V into a lower voltage to keep the power dissipation occurring in the voltage converter at a low level.

In a further especially preferred embodiment of the invention a second diode is connected between the step-down converter and the voltage converter of which the anode is connected to the step-down converter and the cathode is connected to the input of the voltage converter. The second diode can be used to prevent a current flowing to the step-down converter on occurrence of the backwards current and leading there to damage or to a fault.

The inventive device is especially advantageously in the form of an engine controller for a motor vehicle. In this case the invention can contribute to protecting the engine controller and can guarantee its reliability especially well. The input of the engine controller is in this case connected to a battery that delivers the supply voltage.

Other features which are considered as characteristic for the invention are set forth in the appended claims.

Although the invention is illustrated and described herein as embodied in a device for preparing a supply voltage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
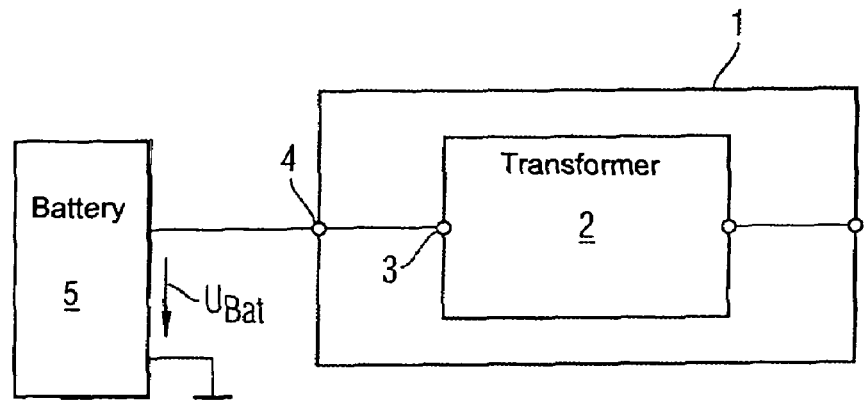
FIG. 1 is a block diagram of a known engine controller with a voltage converter in a motor vehicle.

In all the figures of the drawing, sub-features and integral parts that correspond to one another bear the same reference symbol in each case. Referring now to the figures of the drawing in detail and first, particularly, to FIG. 1 thereof, there is shown a prior art configuration of a known device for preparing a supply voltage. FIG. 1 shows an engine controller 1 which features a voltage converter 2. An input 3 of the voltage converter 2 is connected directly to an input 4 of the engine controller 1 and this is also connected to a battery 5 which delivers a supply voltage UBat. The supply voltage provided by the battery usually has a rated voltage of UBat≈12V in this configuration.

Figure 2:
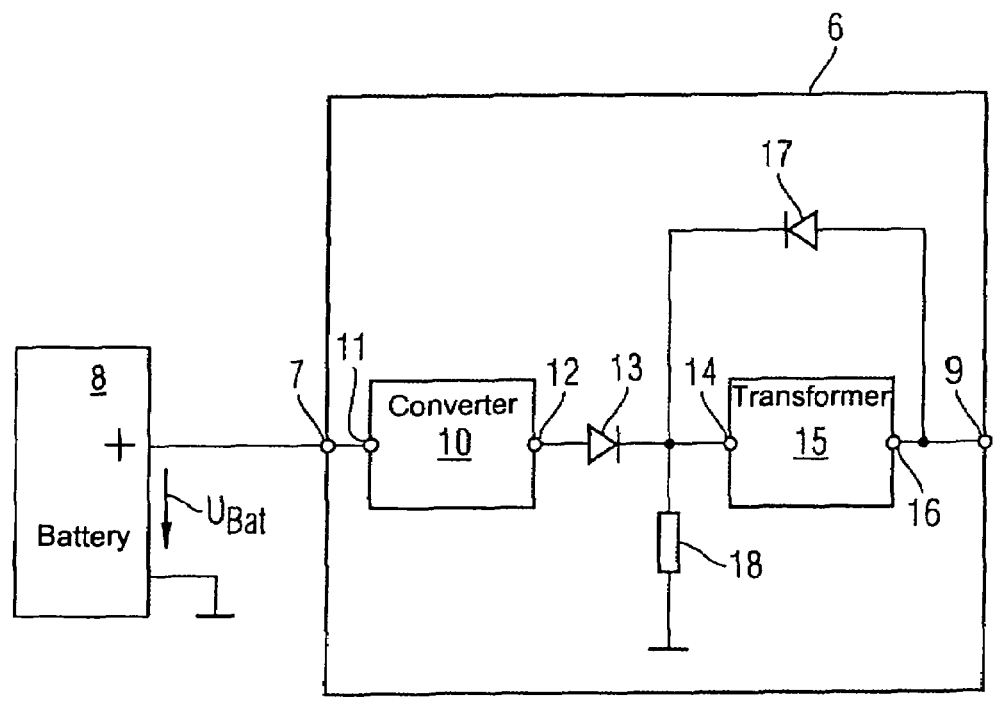
FIG. 2 is a block diagram of a first exemplary embodiment of a device for preparing a supply voltage with a step-down converter according to the invention.

FIG. 2 shows a first exemplary embodiment of the device for preparing a supply voltage according to the invention. The inventive device is embodied here as an engine controller 6 for controlling an engine and other components of the engine, such as sensors in a motor vehicle for example.

The engine controller 6 features an input 7 that is connected to a positive supply terminal of a battery 8 disposed outside the engine controller 6. The battery 8 makes available a battery voltage UBat that represents the supply voltage for supplying the engine controller 6. In the present case the battery 8 delivers a dc voltage of 42 V.

The engine controller 6 further features an output 9 at which a control output voltage is output. To provide the control output voltage at its output 9 the engine controller 6 prepares the supply voltage present at its input 7 in a suitable manner.

To this end the engine controller 6 contains a step-down converter 10 of which the input 11 is connected to the input 7 of the engine controller 6, so that the supply voltage, meaning the battery voltage UBat, is present at the input 11. An output 12 of the step-down converter 10 is connected via a diode 13 to an input 14 of a voltage converter 15. In this case the diode 13 is switched so that its anode is connected to the output 12 and its cathode to the input 14 of the voltage converter 15. An output 16 of the voltage converter 15 is connected to the output 9 of the engine controller 6 so that the output voltage supplied by the voltage converter 15 at its output 16 is passed on the output of the engine controller 6 and is available as a control output voltage at the output 9 of the engine controller 6 for supplying sensors and other components, especially of the engine.

A further diode 17 that serves as a voltage converter is connected in parallel to the voltage converter 15. The output 16 of the voltage converter 15 is thus connected via the diode 17 to its input 14. The anode of the diode 17 is connected to the output 16 and the cathode to the input 14. The input 14 is also grounded via a resistor 18.

The step-down converter 10 is configured so that it transforms a dc voltage present at its input 11, here the supply voltage of 42 V of the battery 8, into a lower dc voltage, which is used to supply the voltage converter 15 connected downstream from it. The voltage converter 15 is embodied here as a linear voltage converter or alternatively also as a voltage tracker, with which an output voltage can be created at the output 16 which is even lower than the voltage output by the step-down converter 10. The step-down conversion of the voltage by the step-down converter 10 reduces the power dissipation generated by the voltage converter 15.

If a short circuit to the battery 8 occurs at the output 9 or at the output 16 a negative voltage is present at the voltage converter 15. Therefore, there is a positive backwards voltage from the output 16 to the input 14 of the voltage converter 15. This is also present at the parallel connected diode 17. The diode 17 is thus in its conducting state, so that a current can flow through it.

In the present exemplary embodiment in accordance with FIG. 2 the diode 17 is connected to ground via the resistor 18 so that the current flows to ground through the diode 17 and through the resistor 18. The diode 17 involved is a bipolar diode for which in the conducting state there is a voltage drop of around 0.7 V. Therefore the voltage drop from the output 16 to input 14 of the voltage converter 15 amounts to around 0.7 V. A higher voltage cannot—viewed in the feedback direction—drop from the output 16 to the input 14 of the voltage converter 15. The voltage converter 15 is advantageously protected by this since the maximum voltage drop at it in the feedback direction lies below its breakdown voltage. The voltage converter cannot be destroyed by a short circuit present at its output 16. This greatly increases the reliability of the engine controller 6.

In the case of a short circuit condition at the output 16, the diode 13 is in the off state. The current flowing through the diode 17 to ground is thus blocked by the diode 13 and cannot flow in the direction of the step-down converter 10. The latter is thereby protected.

As a result of the simple embodiment of the voltage limiter, being the diode 17, only a very small space is advantageously required for its implementation on a circuit board. The circuit board is not significantly enlarged by the provision of the resistor 18 and the diode 13. Furthermore the invention can thus be implemented especially (cost) effectively. Good handling is also provided as regards the currents required.

Figure 3:
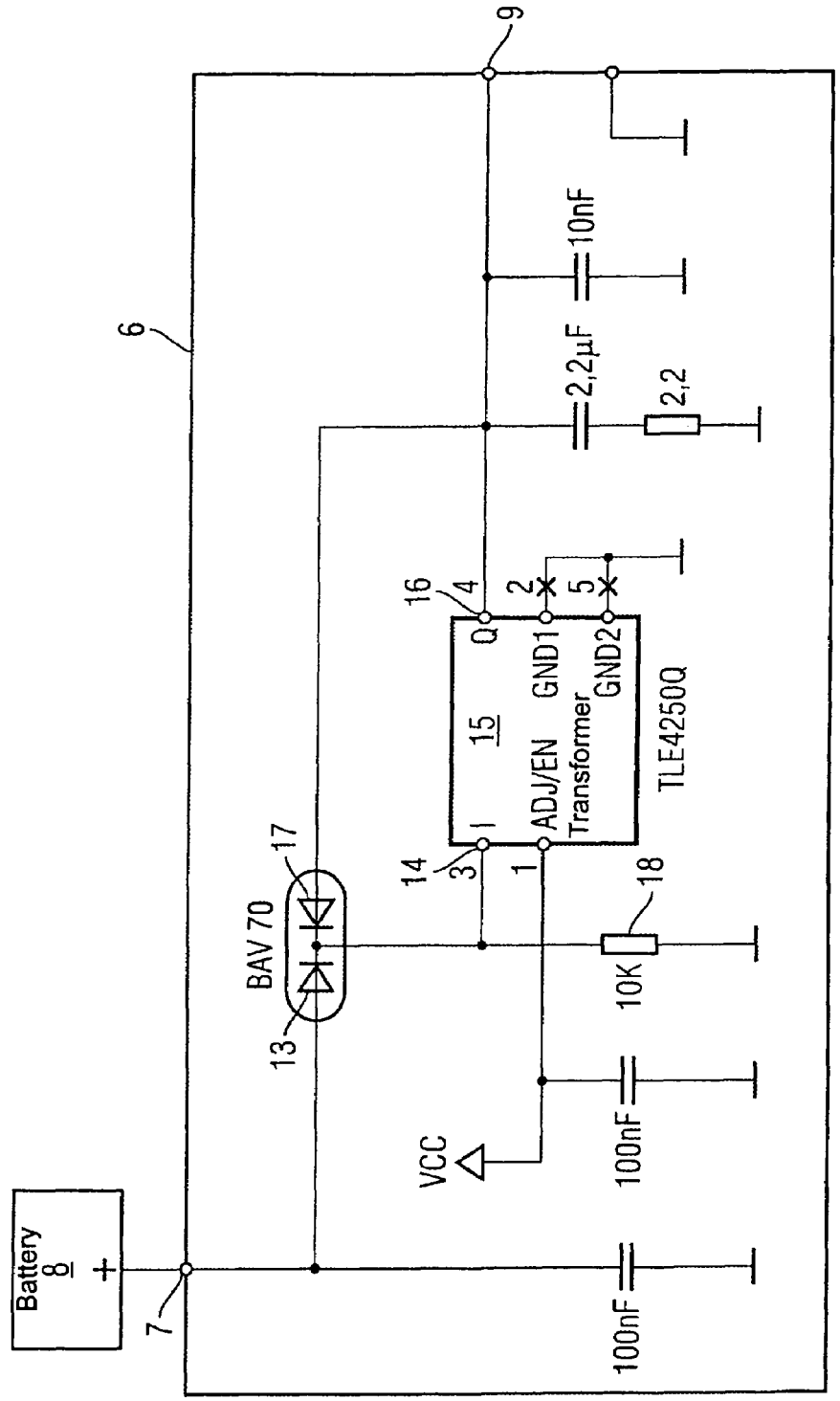
FIG. 3 is a block diagram of a second, more precisely specified exemplary embodiment of the device being an engine controller without step-down converter according to the invention.

FIG. 3 shows a second exemplary embodiment of the inventive device being the engine controller 6. In this exemplary embodiment no step-down converter is connected upstream from the voltage converter 15. The voltage converter 15 is thus supplied directly by the battery 8. The layout and the components of the engine controller circuit are specified precisely. The voltage converter 15 is a so-called voltage tracker TLE4250G, at the input of which ADJ/EN a reference voltage vcc is present, to which the voltage converter 15 sets the input voltage present at input I, which corresponds to the input 14 (FIG. 1). The output Q corresponds to the output 16 (FIG. 1) of the voltage converter 15.

Although the present invention has been described here with reference to a preferred exemplary embodiment, it is not restricted to this embodiment, but can be modified in any one of a number of ways.

The present invention has been described on the basis of an engine controller for a motor vehicle. It is however also possible to use it in other applications in which a voltage converter is to be protected from a voltage dropping within it in the backwards direction from its input to its output, especially in the case of a short circuit.

We claim:

1. A device for converting a direct-current voltage, the device comprising:
    a voltage converter having a converter output and a converter input obtaining a direct-current voltage, said voltage converter converting the direct-current voltage present at said converter input into an output voltage available at said converter output;
    a voltage limiter coupled between said converter output and said converter input for limiting a backwards voltage dropping from said converter output to said converter input;
    a ground connection; and
    a resistor connected between said converter input and said ground connection, said resistor limiting a current flowing from said converter output, through said voltage limiter to said converter input, and further to said ground connection.

2. The device according to claim 1, wherein said voltage limiter is disposed in parallel to said voltage converter.

3. The device according to claim 1, wherein said voltage limiter includes a diode having an anode connected to said converter output and a cathode connected to said converter input.

4. The device according to claim 1, further comprising:

a device input for inputting a direct-current voltage; and a step-down converter connected between said device input and said converter input for converting the direct-current voltage being input at said device input into a lower direct-current voltage being output to said converter input.

5. The device according to claim 4, further comprising a diode connected between said step-down converter and said voltage converter, said diode having an anode connected to said step-down converter and a cathode connected to said converter input.

6. The device according to claim 1, wherein the device is an engine controller for a motor vehicle.

7. The device according to claim 6, further comprising a device input connected to an energy supply, said device input coupled to said converter input.

8. The device according to claim 6, further comprising a device input connected to a battery, said device input coupled to said converter input.

9. The device according to claim 1, wherein the output voltage being output at said converter output is lower than the voltage present at said converter input.

* * * * *